March 18, 1969 E. T. VAN DER ENDE 3,433,457
HOIST DEVICE FOR DUMP TRUCKS
Filed Sept. 7, 1967
Sheet 1 of 2
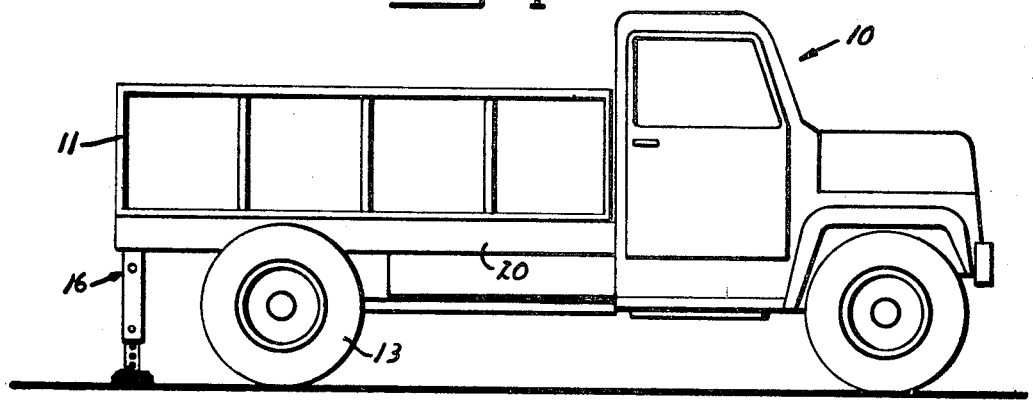
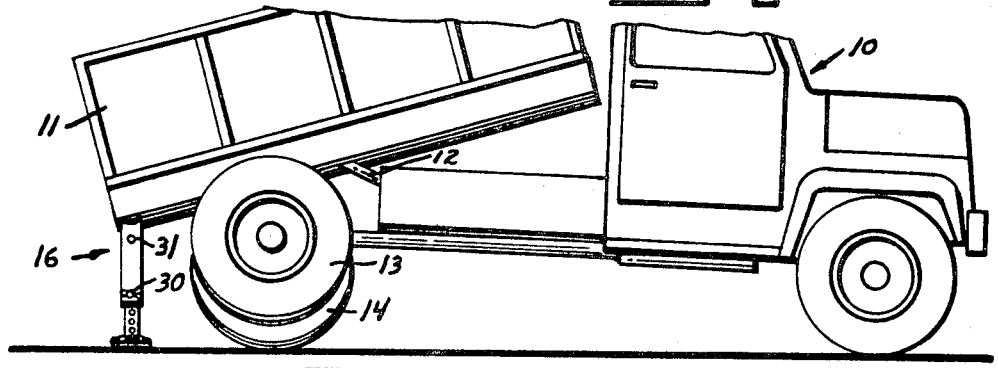
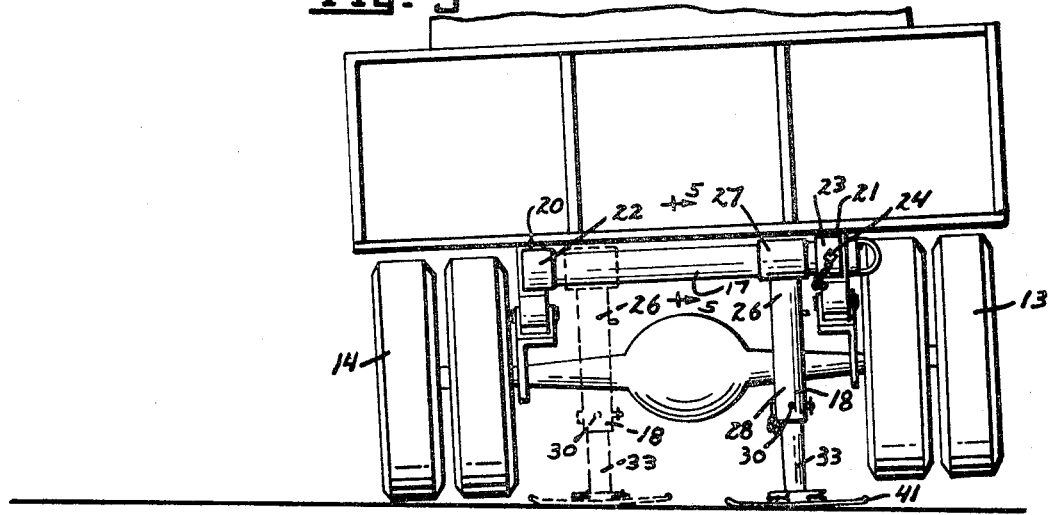
INVENTOR.
ENTJE T. VAN DER ENDE
BY
Wells & St. John
ATTYS.

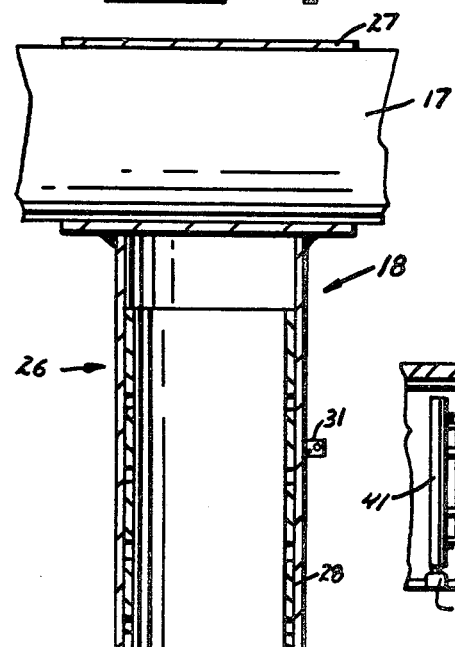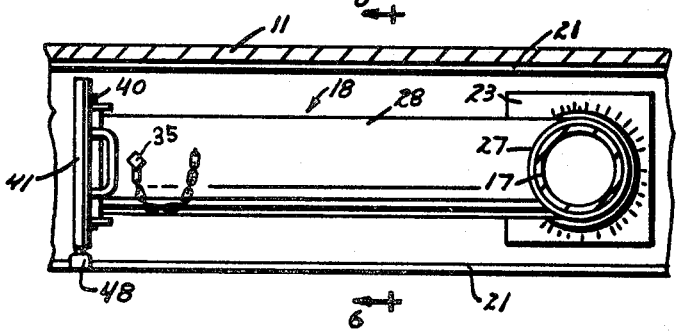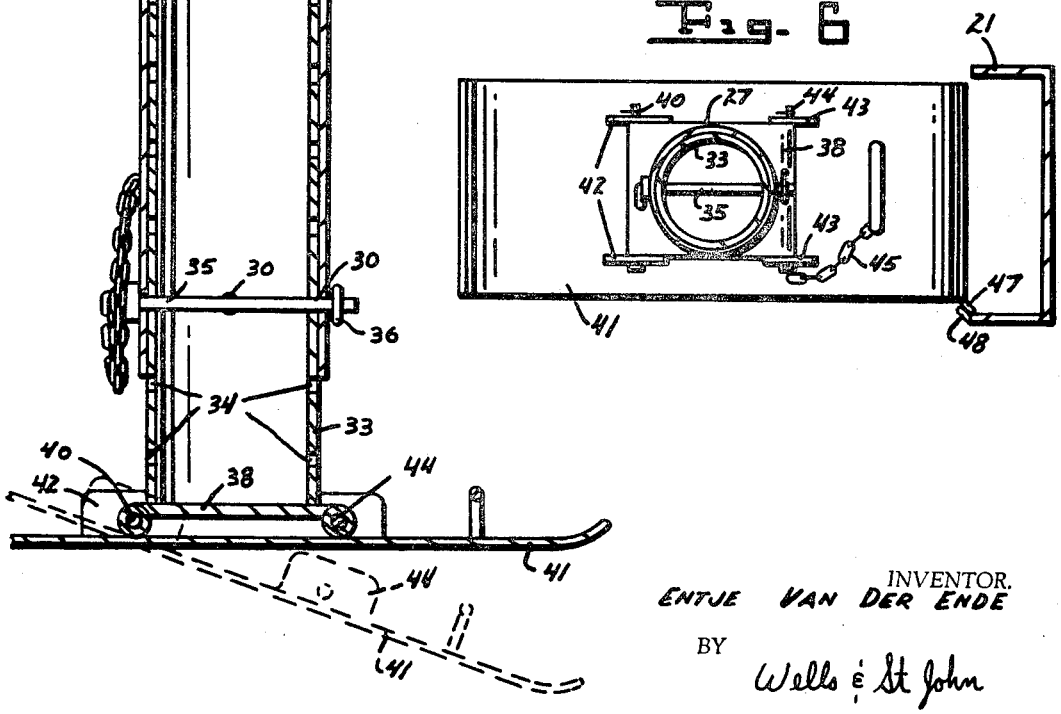

United States Patent Office 3,433,457
Patented Mar. 18, 1969

---

3,433,457
HOIST DEVICE FOR DUMP TRUCKS
Entje T. Van der Ende, Box 221,
Sprague, Wash. 99032
Filed Sept. 7, 1967, Ser. No. 666,078
U.S. Cl. 254—86
Int. Cl. B60s 9/02
2 Claims

ABSTRACT OF THE DISCLOSURE

A hoist device is described for use in conjunction with the hydraulic dump system of a truck bed for lifting one or both of the rear wheels from the ground. The hoist device includes a shaft that is transversely mounted across the back of the truck bed and an adjustable support leg that is pivotally and slidably mounted on the shaft for positioning at various transverse locations to support the rear of the bed as the bed is pivoted to lift one or both of the rear wheels depending upon the position of the leg.

---

Background of the invention

This invention relates to hoist devices and more particularly to hoist devices that are carried by dump truck for raising the rear wheels off the ground.

Frequently farm or construction trucks, having a hydraulically operated dump bed, become stuck in mud and are unable to move. Generally another truck or a tractor is then brought to the site to pull or push the stuck truck out of the mud. Sometimes both vehicles become stuck. If another truck or tractor is not available a jack must be found for lifting the truck frame up to lift the wheels from the mud. Planks or the like are then inserted under the wheels to provide support. The use of jacks becomomes quite burdensome and frequently dangerous because some one must get under the truck to properly position the jack under a frame member. Usually the operator becomes quite dirty and must change his clothes before getting into the cab of the truck.

Many of these same disadvantages are also present when it is desired to change one or more of the tires on the rear wheels.

One solution proposed is to utilize the hydraulic dump system of the truck bed in facilitating the raising of the rear wheels off the ground. In U.S. Letters Patent No. 2,570,334, issued Oct. 9, 1951, it is suggested that telescoping tubular props be positioned at the rear corners of the truck bed for extending downward to the ground to provide rear supports to raise the rear truck wheels when the bed is pivoted to the dump position. Each prop is associated with one side of the truck and is connected to the truck bed through a universal joint which permits the pivotal movement of the truck in all directions. This arrangement is quite costly and requires precision machining of the moving elements. Also the arrangement accents the problem of the rear of the truck sliding sideways in the mud while the wheels are being raised. Ofter this presents a very dangerous situation.

One of the principal objectives of the invention is to provide a hoisting device that is used in combination with the hydraulic dump system of the truck bed that is inexpensive to construct, economical to maintain and efficient in operation and which is safe for raising the rear wheels off the ground.

A further object of this invention is to provide a single extendable leg that can be positioned transversely along the rear of the bed for enabling the raising of one or both of the rear wheels off the ground when the bed is elevated to the dump position.

An adidtional object of this invention is to provide a hoist device with a ground engaging foot that is self centering to conform with the contour of the ground to provide maximum support.

A still further objective of this invention is to provide a very simple hoist device that is easy to adjust transversely move to various positions with a minimum of effort and time.

An additional object of this invention is to provide a hoist device that does not accent the side slipping of the truck as one side is raised.

These and other objects and advantages of this invention will become apparent upon the reading of the following detailed description of a preferred embodiment of the invention.

Brief description of the drawings

A preferred embodiment of this invention is illustrated in the accompanying drawings, in which:

FIG. 1 is a side elevation view of a truck having a hydraulically operated truck bed with a hoist device attached to the rear of the bed for raising one or both of the rear wheels of the truck;

FIG. 2 is a fragmentary side elevation view of the truck showing the rear wheel on the left side elevated from the ground by the deployment of the hoist device at the rear of the truck bed as the bed is pivoted to the dump position;

FIG. 3 is a rear view of the truck with the hoist device transversely positioned right of center to assist in the raising of the rear wheels on the right side; the alternate position of the hoist device is shown in dotted line;

FIG. 4 is a fragmentary cross sectional view taken along the longitudinal axis of the hoist device;

FIG. 5 is a fragmentary cross section view taken along the line 5—5 in FIG. 3, showing the hoist device in the carrying position below the truck bed;

FIG. 6 is a fragmentary cross sectional view taken along line 6—6 in FIG. 5.

Description of the preferred embodiment

Referring to FIG. 1, there is shown a truck generally designated by the arrow 10 that has dump bed 11 which may be pivoted upward by a hydraulic actuator 12 to gravity dump the load from the bed. The purpose of the invention is to provide a hoisting device that in combination with the hydraulic dump system lifts the left rear 13 or the right rear 14, or both rear wheels 13 and 14 off the ground to facilitate the changing of tires, etc.

The hoist device is generally designated by the arrow 16 and is attached to the underside of the truck bed spaced rearward of the rear wheels 13 and 14. The hoist device has two principal parts—a transverse shaft 17 (FIG. 3) and an extendable leg 18.

The hoist device is mounted between the truck bed longitudinal frame channels 20 and 21. The channels 20 and 21 are spaced from the longitudinal center line of the truck. Each of the channels 20 and 21 is an inwardly facing U-shaped channel iron with the flange portions extending toward the longitudinal center line.

A tubular bracket 22 (FIG. 3) is secured to the inside of the channel 20 and faces the other channel 21. A hole (not shown) is formed in the channel 21 in transverse alignment with the bracket 22 for facilitating the insertion and the removal of the transverse shaft 17 therethrough. A tubular bracket 23 is affixed to the inside of the channel 21 in alignment with the bracket 22 and the hole in the channel 21. The transverse shaft 17 is positioned across the underside of the bed with one end supported in the bracket 22 and the other end supported in the bracket 23. When the transverse shaft 17 is properly positioned a pin 24 may be inserted through the bracket 23 and one end of the shaft 17 to prevent the shaft from rotating or moving axially. To remove the shaft 17 the operator merely moves the pin 24 and pulls the shaft through the channel 21.

The leg 18 is pivotally mounted on the shaft 17 for longitudinal pivotal movement from a carrying position (see FIG. 5) in which the leg is held substantially horizontal beneath the truck bed to an operating position in which the leg is extending downward in a substantially vertical orientation for engaging the ground to support the rear of the truck bed. The leg 18 is also slidably mounted on the shaft 17 so that the leg can be positioned at various locations along the shaft depending upon whether it is desired to lift the left rear wheel, the right wheel or both rear wheels. If it is desired to lift the right rear wheel the leg 18 is positioned right of the longitudinal center line so that the transverse center of gravity is on the left side of the leg 18. When the front of the truck bed is pivoted upward the rear of the truck and the leg 18 will move downward with the leg 18 engaging the ground to support the rear right side of the truck to cause the right wheel to move upwardly off the ground.

If the leg 18 is moved to the left side of center, then the left side of the truck will raise when the bed is pivoted upward. If the leg 18 is positioned in the center, then both wheels will move off the ground.

The leg 18 has a T-shaped upper section 26 and an elongated tubular lower section 33. The upper section 26 has a tubular cross member 27 that is coaxially mounted on the shaft 17 for pivotal and axial slidable movement thereto. The center or middle member 28 is also tubular and extends radially from the member 27 for housing the lower section 33. The tubular member 28 has a plurality of diametrically opposed angularly spaced holes 30 that are formed thereon near the lower end thereof for adjusting the angular and axial position of the lower tubular section 33. A bracket 31 with a small hole therein is welded to the side of the member 28 for receiving and supporting a cotter pin 36 when it is not being used.

The lower tubular section 33 is mounted coaxially within the member 28 and may be adjusted angularly and axially to extend or contact the length of the leg 18 depending upon the circumstances. The tubular section 33 has a plurality of diametrically opposed pairs of holes 34 formed along the length of the section 33 for adjusting the length of the leg. A bolt 35 is inserted through the holes 30 and 34 to secure the section 33 to the member at the desired angular relationship and length. The cotter pin 36 is inserted through the end of the bolt 35.

The lower section 33 has a base plate 38 (FIG. 4) that is affixed along the bottom of the section 33. The plate 38 has a pivot shaft 40 mounted along one side thereof for pivotally supporting a flat shoe 41 thereto. The pivotal connection enables the shoe to adopt to the contour of the ground to provide maximum support.

The shoe 41 has a substantial ground engaging area for providing support even though ground is soft and muddy. A pivot bracket 42 is affixed to the upper side of the shoe 41 for receiving the shaft 40. A lock bracket 43 is mounted on the upper side of the shoe 41 for receiving a locking pin 44 to prevent the shoe from pivoting about the shaft 40. A chain 45 interconnects the pin 44 and the shoe 41 to prevent the inadvertent loss of the pin 44.

FIGS. 5 and 6 show the leg in the carrying position beneath the bed. As shown in FIG. 6, a lug 47 is affixed to one corner of the rectangular shoe 41. To place the leg 18 in the carrying position the leg 18 is moved to the left, as viewed in FIG. 3 and then pivoted forward and upward in a substantially horizontal position. Then the leg 18 is moved slightly to the left to insert one side of the shoe 41 into the channel 21. A lip 48 is formed on the flange of the channel 21 for engaging the lug 47 to prevent the inadvertent sliding movement of the leg 18 from the channel 21. To remove the leg 18, one needs only to lift the leg slightly to clear the lug 47 from the lip 48 and then slide the leg along the shaft 17 to remove the shoe from the channel 21. The leg 18 can then be swung downward into the operating position.

An added use that may be made of the hoist device 16 is to support the rear of the truck bed when very heavy vehicles such as tractors, etc. are loaded onto the bed to prevent the bed from tipping upward above the desired loading inclination.

It should be understood that the above described embodiment is simply illustrative of the principles of this invention and certain modifications may be made to the embodiment as shown without deviating from the invention. Therefore only the following claims are intended to define the invention.

What I claim is:
1. A hoist device for the rear wheels of a dump truck that has a hydraulicaly operated pivoted dump bed that extends rearward of the rear wheels and has two spaced parallel inwardly facing frame channels that straddle the longitudinal center line of the truck, said hoist device comprising:
   (a) a shaft transversely mounted to the underside of the dump bed behind the rear wheels, wherein a hole is formed in one of the channel frames for permitting insertion and removal of the shaft and wherein a tubular bracket is mounted on the inside of the other channel facing the hole for receiving and supporting one end of said shaft with the shaft extending to both sides of the longitudinal center line of the truck; and
   (b) an adjustable length leg movably mounted on the shaft for pivotal movement from a carrying position underneath the bed to an operating position extending downward from the shaft for engagement with the ground to raise the rear wheels of the truck above the ground when the bed is operated to the dump position; said leg being slidably mounted on the shaft for axial positioning along the shaft so that a single leg may be utilized for lifting either or both of the rear wheels.

2. A hoist device as defined in claim 1 wherein the bed has a longitudinal and inwardly facing U-shape frame channel with an upwardly projecting lower flange having a lip formed thereon and wherein the leg shoe has a lug formed on one corner thereof for engaging the channel lip to prevent the slidably movement of the leg when the leg is in the carrying position with the shoe extending into the inwardly facing channel frame.

References Cited
UNITED STATES PATENTS

| | | | |
|---|---|---|---|
| 2,570,334 | 10/1951 | Erjavec | 254—86 |
| 2,750,149 | 6/1956 | Mermelstein | 254—86 |
| 3,007,677 | 11/1961 | Dalton | 254—56 |

OTHELL M. SIMPSON, *Primary Examiner.*